Patented Jan. 1, 1952

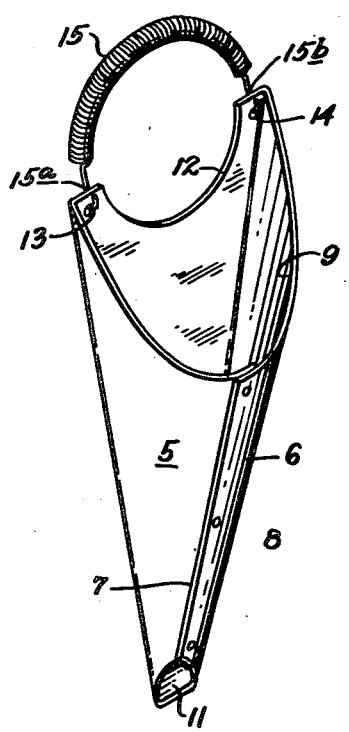
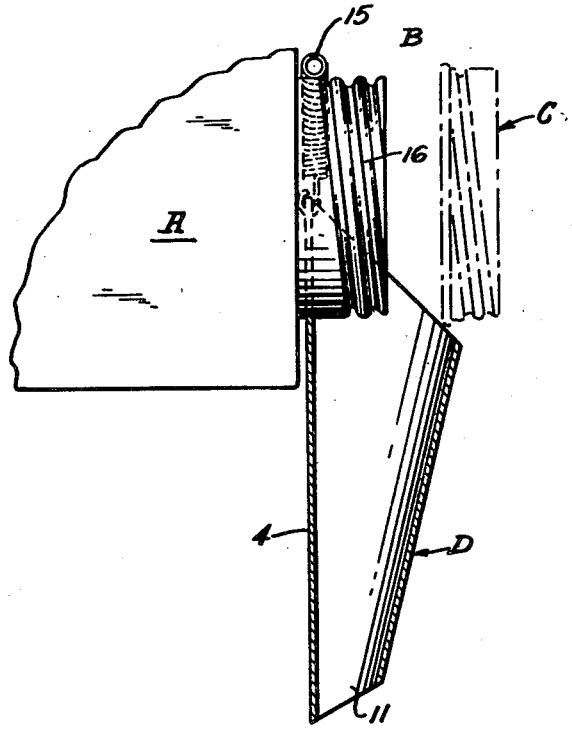
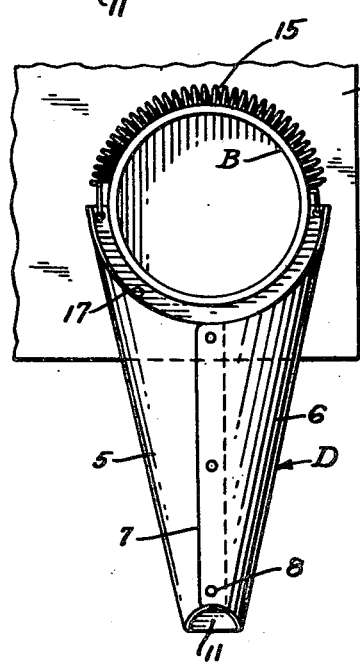

2,580,811

UNITED STATES PATENT OFFICE 2,580,811

DETACHABLE SPOUT FOR CONTAINERS

Nikolai Martinsen, Palo Alto, Calif.

Application October 10, 1949, Serial No. 120,433

1 Claim. (Cl. 222—460)

This invention relates to an improved pouring funnel for use in association with a container having an outwardly projecting pouring spout of given diameter.

The particular embodiment of my invention which is illustrated in the drawings and which will be described hereinafter in more detail comprises generally a funnel piece, having an inlet opening and an outlet opening which is formed with an arcuate cut-out proportioned to semi-circumferentially engage the projecting pouring spout of a container. Means comprising a resiliently contractable spring element is provided to clamp the funnel piece securely into engagement with the pouring spout of the container, and the funnel piece in combination with the pouring spout of the container is adapted to facilitate transfer of liquid from the container to another receptacle or container without spilling of the liquid during pouring or liquid transfer operations.

A principal object of the present invention is to provide a novel pouring funnel of the character heretofore mentioned which is constructed to allow substantially unobstructed access to and from the container spout to which it is attached in a direction along the projected axis of said spout, which arrangement, in turn, permits easy and rapid removal and replacement of a conventional removable container cap over the spout without the necessity of having to remove or dislodge the pouring funnel from its clamped engagement with said spout.

Another object of the present invention is to provide a removable pouring funnel for containers which is constructed in such manner as to greatly lessen the possibility of spilling the liquid during pouring operations.

Further objects of the present invention will become apparent upon reading the following specification and referring to the accompanying drawings in which similar characters of reference represent corresponding parts in each of the several views.

In the drawings:

Fig. 1 is a perspective view of the present invention.

Fig. 2 is a view in side elevation partially in section of the present invention shown operatively attached to a projecting spout of a container (shown fragmentarily) and showing in broken lines a conventional screw cap for said spout.

Fig. 3 is a plan view of the invention shown operatively attached to the spout of a container (shown fragmentarily).

Referring now more particularly to the drawings, there is indicated generally at A a container (shown fragmentarily) such as a conventional five gallon oil or kerosene can having a projecting threaded spout, indicated generally at B. A removable cap for the spout, is indicated in broken lines generally at C, and the pouring funnel, indicated generally at D, constitutes the principal subject matter of the present invention.

The pouring funnel heretofore indicated at D comprises, more specifically, a substantially flat base portion 4 and upwardly turned sides 5 and 6 formed integrally with said base portion, which are joined together along a top seam 7 as by rivets 8, to form a cover for the base portion.

The base portion and the cover are shaped and assembled to present a funnel like piece having an enlarged inlet opening, indicated at 9 and a relatively smaller outlet opening, indicated at 11.

The wider end of the base portion adjacent inlet opening 9 is formed with a substantially semi-circular cut-out, indicated generally at 12, shaped and proportioned to fit around and snugly semi-circumferentially engage spout B of the container A. A pair of small apertures, indicated at 13 and 14, respectively, are formed on either side of arcuate cut-out 12 in the base portion, and these said apertures are adapted to receive suitable hooked portions 15ª and 15ᵇ of a resilient contractable spring, indicated at 15.

In operation, a pouring funnel of the type hereinabove described may be clamped to a projecting pouring spout, such as indicated generally at B, of a container. In this respect it is noted that the arcuate cut-out 12 of the pouring funnel and the contractable spring 15 coact to firmly clamp around and engage the circumference of the cylindrical spout at a point thereon below the mouth thereof and below the cap receiving threaded portion 16 of the spout.

The construction of the pouring funnel is such that when it has been clamped to the container spout in the above manner no part of the material forming the cover portion of the funnel piece overlies directly the mouth of the spout B. This relationship is clearly illustrated in Fig. 3 wherein it is seen that the cover is formed with an arcuate cut-out, indicated generally at 17, which has a substantially greater radius of curvature than arcuate cut-out 12 formed in the base portion. When viewed in plan, it is seen that semi-circular cut-out 12 is disposed beneath and lies concentrically within semi-circular cut-out 17 formed in the cover portion of the funnel piece. Such an arrangement of parts allows substantially unobstructed axis to and away from the spout along a projected axis thereof which, in turn, permits a user to readily and conveniently remove and replace a conventional container cap, such as is shown in broken lines at C, without having to remove or dislodge the pouring funnel from its attached position with respect to the spout.

Although I have described my invention in some detail by way of illustration and example for purposes of clarity of understanding, it is understood that certain changes and modifications may be made within the spirit of the invention and scope of the appended claim.

I claim:

A pouring funnel for use in association with a container having a flat top having an upwardly projecting spout of given diameter which is adapted to receive a removable cap thereover comprising, a substantially flat base portion, a cover over said base portion, said base portion and said cover shaped and assembled to form a funnel piece having an inlet opening and an outlet opening, said base portion formed with a substantially semi-circular cut-out adjacent the inlet opening end thereof proportioned to snugly semi-circumferentially engage a container spout of given diameter, means including said cut-out to removably secure said base portion in snug engagement with said spout, whereby said base portion projects outwardly from said spout in a direction substantially normal to the axis of said spout, said cover adjacent the inlet opening end of the funnel piece formed with a substantially semi-circular cut-out in plan having a radius of curvature substantially greater than the radius of curvature of said semi-circular cut-out formed in said base portion, said semi-circular cut-outs formed respectively in said base portion and in said cover positioned relatively to one another whereat the cut-out formed in said base portion is disposed concentrically with respect to the cut-out formed in said cover whereby substantially unobstructed access may be had to said spout along its projected axis to permit removal and replacement of a removable cap thereover when said pouring funnel has been removably secured to said spout, the inlet end of said cover portion spaced outwardly from the top of the spout to which it is connected, said base portion disposed parallel to the container top and interposed between the top of the container to which it is attached and said cover portion whereby liquid poured from said spout into the said funnel is directed through said funnel without contacting the said top of the container from which poured.

NIKOLAI MARTINSEN.

REFERENCES CITED

The following references are of record in the file of this patent:

UNITED STATES PATENTS

| Number | Name | Date |
|---|---|---|
| 398,798 | Trubel | Dec. 18, 1888 |
| 426,165 | Brittin | Apr. 22, 1890 |
| 1,165,285 | Record | Dec. 21, 1915 |
| 1,191,464 | Record | July 18, 1916 |
| 1,617,273 | Piquet | Feb. 8, 1927 |
| 1,965,356 | Rittenhouse | July 3, 1934 |
| 2,200,642 | Shell | May 14, 1940 |